United States Patent
Popesco

(10) Patent No.: US 7,510,136 B2
(45) Date of Patent: Mar. 31, 2009

(54) CABLE GUIDE OF A MARITIME POWER SUPPLY SYSTEM

(75) Inventor: Ottonel Popesco, Vedano al Lambro (IT)

(73) Assignee: Ipalco B.V., Alblasserdam (NL)

( * ) Notice: Subject to any disclaimer, the term of this patent is extended or adjusted under 35 U.S.C. 154(b) by 178 days.

(21) Appl. No.: 11/200,068

(22) Filed: Aug. 10, 2005

(65) Prior Publication Data
US 2006/0113424 A1    Jun. 1, 2006

(30) Foreign Application Priority Data
Dec. 1, 2004    (EP)    ................................ 04106227
Jun. 13, 2005    (WO)    ................ PCT/EP2005/052716

(51) Int. Cl.
*B65H 27/00* (2006.01)
(52) U.S. Cl. ................... 242/397.3; 242/615.3
(58) Field of Classification Search ................ 242/615, 242/615.3, 397, 397.1–397.3; 191/12.2 R
See application file for complete search history.

(56) References Cited

U.S. PATENT DOCUMENTS

| | | | |
|---|---|---|---|
| 3,602,730 A | | 8/1971 | Cushing |
| 3,720,070 A | * | 3/1973 | Raves .......................... 405/175 |
| 3,861,505 A | * | 1/1975 | Sugimura ............... 191/12.2 R |
| 3,872,680 A | * | 3/1975 | Nicholson et al. ......... 405/168.3 |
| 4,789,108 A | * | 12/1988 | Recalde .................... 242/388.7 |
| 6,276,454 B1 | * | 8/2001 | Fontana et al. .............. 166/343 |
| 6,276,503 B1 | * | 8/2001 | Laughlin, Jr. ........... 191/12.2 R |
| 6,530,432 B2 | * | 3/2003 | Gipson ........................ 166/384 |
| 2004/0195066 A1 | | 10/2004 | Widegren |

FOREIGN PATENT DOCUMENTS

FR    2647604    11/1990

OTHER PUBLICATIONS

"Ship is 1st to install system to limit pollution in harbor", Daily Breeze, http://pqasb.pqarchiver.com/dailybreeze/access/676676781.html?dids=676676781;67 . . . , Oct. 13, 2005, 2 pages (Published Article).

* cited by examiner

*Primary Examiner*—Sang Kim
(74) *Attorney, Agent, or Firm*—Oblon, Spivak, McClelland, Maier & Neustadt, P.C.

(57) ABSTRACT

Cable guide assembly of a maritime power supply system for guiding a power cable assembly from and to a reel, the cable guide assembly comprising a reel for storing a power cable assembly thereon; and a cable guide having a first end and a second end. The cable guide comprises first and second support elements arranged parallel to each other; and a plurality of rolls arranged between the support elements for supporting and guiding the power cable assembly between the first and second ends.

12 Claims, 3 Drawing Sheets

CABLE GUIDE OF A MARITIME POWER SUPPLY SYSTEM

INTRODUCTION

The present invention relates to a cable guide assembly of a maritime power supply system (MPS).

BACKGROUND OF THE INVENTION

The environment in ports all over the world is becoming more and more of an issue. In the last 15 years, increasing attention has been paid on how to reduce pollution coming from the diesel engines of ships which traffic, in ever increasing numbers, the ports and terminals. Container, RoRo (roll-on/roll-off), cruise or other M/V (motorized vessel) ships often remain docked in a port for several days and keep their engines running while docked to ensure the functioning of refrigerated containers and life aboard the ship through air-conditioning, controls, etc. It is clear that this constitutes an important pollution issue, which has to be avoided. It has therefore been proposed to supply power to such ships via cables running from the dock to the ship, thereby allowing the engines to be turned off.

One problem with supplying such docked ships with power is the need for a high voltage and high amperage power supply, which has often made it necessary to use up to 10 cables in parallel. Due to this large number of cables it was not possible to connect and disconnect rapidly and safely, not to mention that they also had to cope with uneven loads between the cables. Also, the amount of cables was rather untidy and also dangerous. Furthermore, it is often not possible to align the ship-based power inlet with the dock-based power supply, which means that the cables run alongside the ship either on the dock or on the deck of the ship, causing further obstruction and danger.

The wharf or dock is generally supplied with 6600 V and a significant part of the current shipping fleet is supplied with between 230 V and 660 V, hence the necessity for using step-down transformers and/or converter sets.

A maritime power supply (MPS) system has been proposed wherein a cable management system having a cable reel with a power cable assembly mounted thereon is provided. Such a cable management system can be mounted on the ship, wherein one end of the power cable assembly on the cable management system is connected to a ship-based power inlet. The opposite end of the power cable assembly can be unwound from the cable management system and lowered onto the dock for connection to a dockside power supply. Since the voltage, frequency and amperage of the dockside power supply do not necessarily correspond to the ship's needs, a step-down transformer and/or converter has to be installed between the dockside power supply and the ship-based power inlet.

One problem associated with such systems is that the power cable assemblies are rather heavy and are therefore not easy to lower down to the dockside power supply. More importantly, such power cable assemblies may be damaged if they are repeatedly dragged along the floor, and in particular when dragged over the edge of the ship.

One solution is to use lifting equipment, such as a crane or the like, to lower the power cable assembly to the dockside power supply. A drawback of this solution is that such lifting equipment is not always available and that it does not efficiently prevent the power cable assembly from rubbing on the edge of the ship.

OBJECT OF THE INVENTION

The object of the present invention is to provide a means for safely and easily transport a power cable assembly between a ship-based power inlet and a dockside power supply.

GENERAL DESCRIPTION OF THE INVENTION

According to the invention, a cable guide assembly of a maritime power supply system for guiding a power cable assembly from and to a reel, the cable guide assembly comprising a reel for storing a power cable assembly thereon; and a cable guide having a first end and a second end. The cable guide comprises first and second support elements arranged parallel to each other; and a plurality of rolls arranged between the support elements for supporting and guiding the power cable assembly between the first and second ends.

Such a cable guide assembly can be mounted on board of a ship and allows to safely guide the power cable assembly over the edge of the ship down to the dock, thereby preventing the power cable assembly from being dragged over the edge of the ship, which could damage the power cable assembly. It further eliminates the need for cranes or the like to be used for transporting the end of the cable assembly to be connected to the dockside power supply.

Preferably, the cable guide assembly further comprises a base for supporting the cable guide and the reel, wherein the cable guide is pivotably mounted with the first end on the base, and wherein the cable guide is pivotable between an active position, in which the cable guide is able to guide the power cable assembly over an edge, and a rest position, in which the cable guide is retracted. When not in use, the cable guide can hence be retracted and a more compact configuration can be obtained.

The cable guide assembly advantageously further comprises at least one piston connected between the cable guide and the base for pivoting the cable guide between the active and rest positions and preferably at least one hydraulic pump for operating the at least one piston. Such a hydraulic pump can e.g. be hand operated or motorised.

The cable guide can, at its second end, further comprise a guiding element including two rolls, the two rolls being spaced apart so as to receive and guide the power cable assembly therebetween. Preferably, the guiding element further includes two lateral rolls, the two lateral rolls being spaced apart so as to receive and guide the power cable assembly therebetween. By means of such a guiding element, it can be ensured that, as the power cable assembly is wound onto or unwound from the reel, the power cable assembly is always supported at the second end and is always prevented from being dragged over the edge of the ship.

According to another embodiment, the cable guide comprises three support elements with a first plurality of rolls arranged between the first and third support elements and a second plurality of rolls arranged between the third and second support elements. By means of the third support element, the structure of the cable guide is further strengthened and the cable guide is divided into two separate zones, wherein two separate power cable assemblies can be guided over the edge of the ship independently from each other.

DETAILED DESCRIPTION WITH RESPECT TO THE FIGURES

The present invention will be more apparent from the following description of a not limiting embodiment with reference to the attached drawings, wherein.

The cable guide assembly according to the invention is in particular suited for use with a maritime power supply (MPS) system for supplying power to the ship when docked. Such an MPS system comprises at least one cable management system 15 having a power cable assembly 16 wound on a reel 18. The power cable assembly 16 has, at a first end, first connection means (not shown) for connecting the cable management system 15 to the ship and, at an opposite second end, second connection means 22, preferably 6600 V electrical connectors, for connecting the cable management system 15 to a dockside power supply. The reel 18 is arranged such that the power cable assembly 16 can be wound thereon and wound therefrom as needed.

Figure 1:
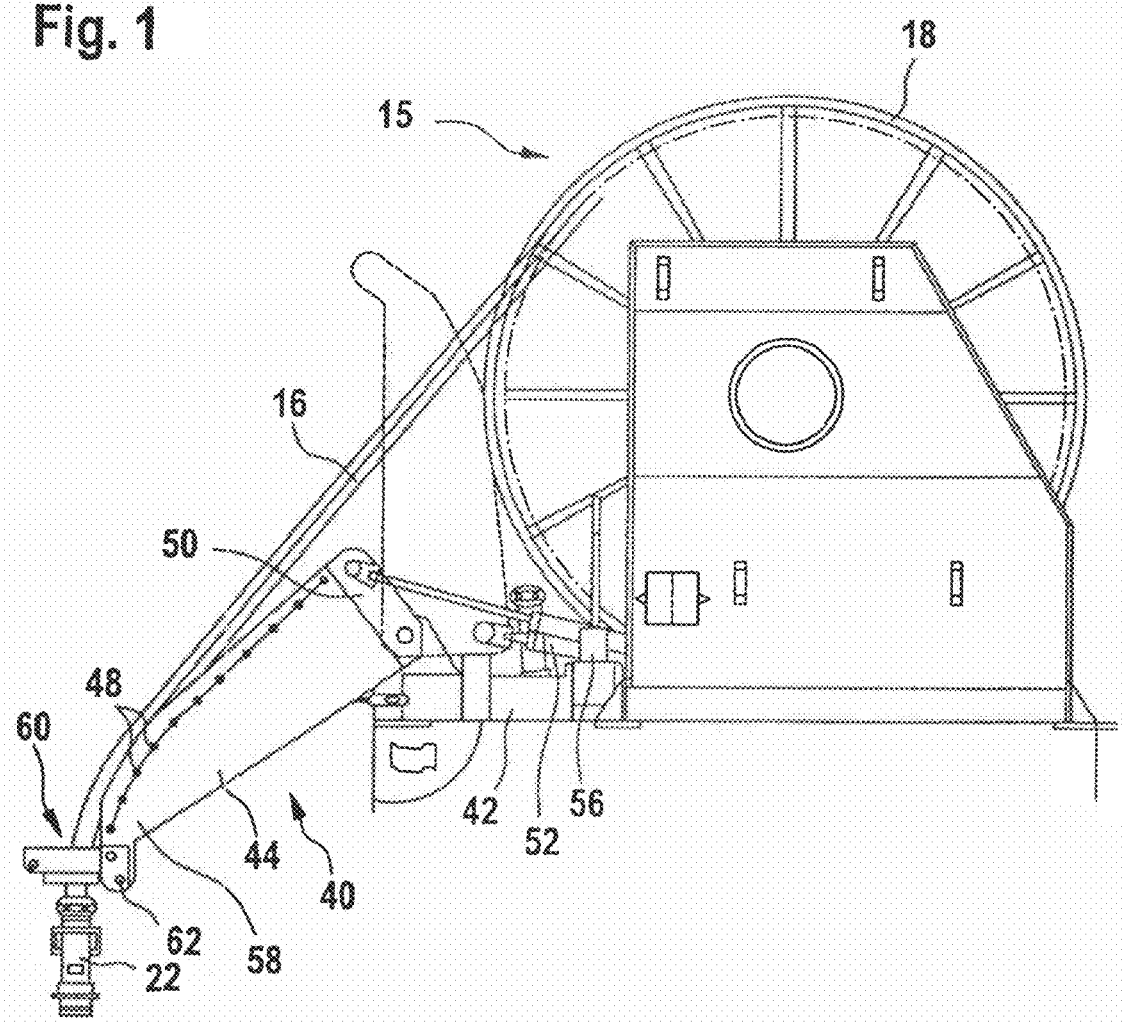
FIG. 1 is a side view of a reel of an MPS system comprising a cable guide assembly according to the invention.

The MPS system further comprises a pivotable cable guide 40 arranged near the dock-facing sidewall of the ship. The cable guide 40 is pivotable between an active position as shown in FIG. 1 and a rest position as shown in dotted lines in FIG. 1. The cable guide 40 is arranged such that, when it is in its active position, it is capable of guiding the power cable assembly 16 over the edge of the container ship. Damage to the power cable assembly 16 by dragging the latter over the edge of the ship can thereby be prevented. When not in use, the cable guide 40 can be retracted and be brought into its rest position, whereby a more compact configuration of the MPS system can be obtained.

Figure 2:
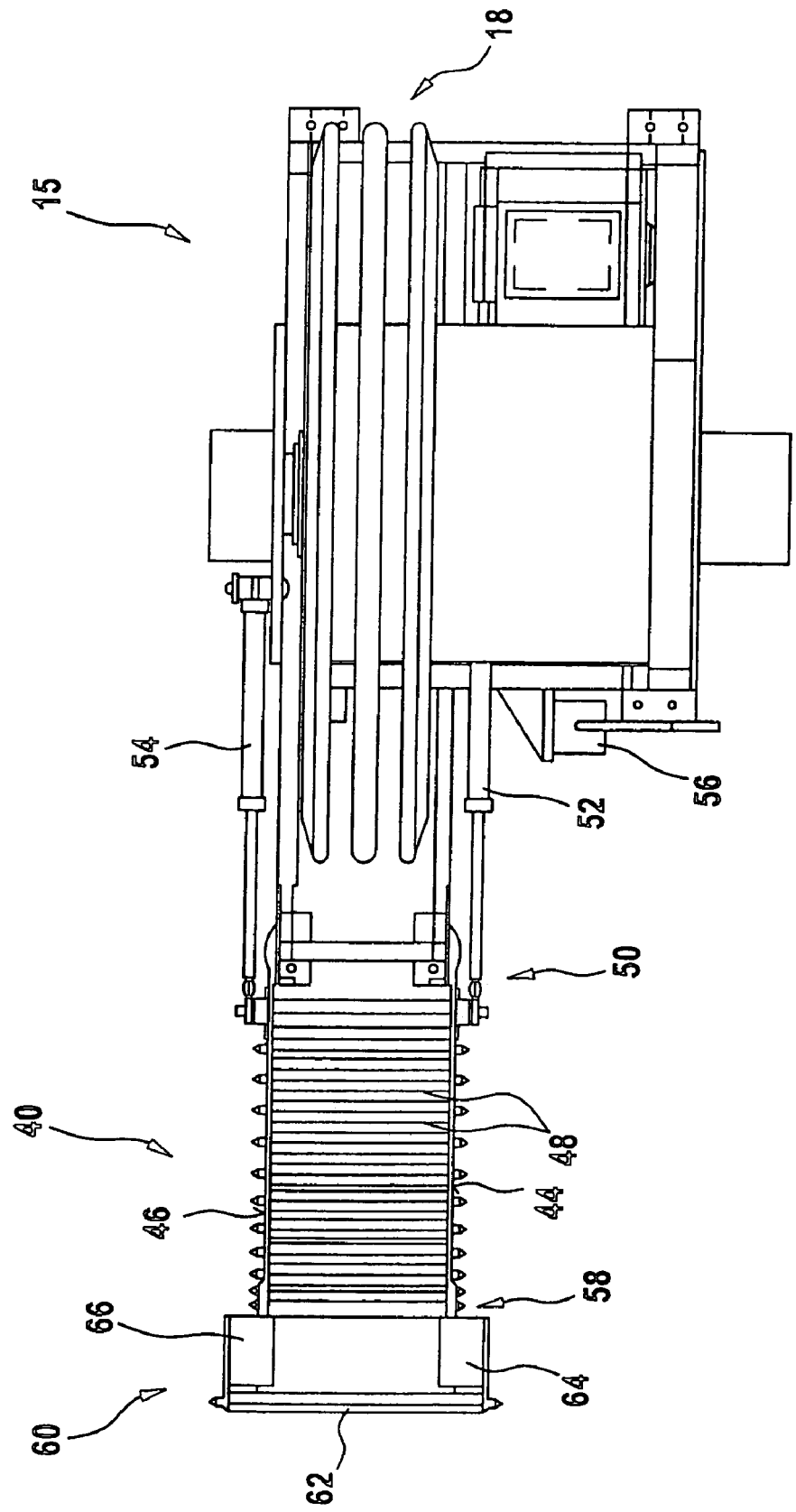
FIG. 2 is a top view onto the reel of FIG. 1.
Figure 3:
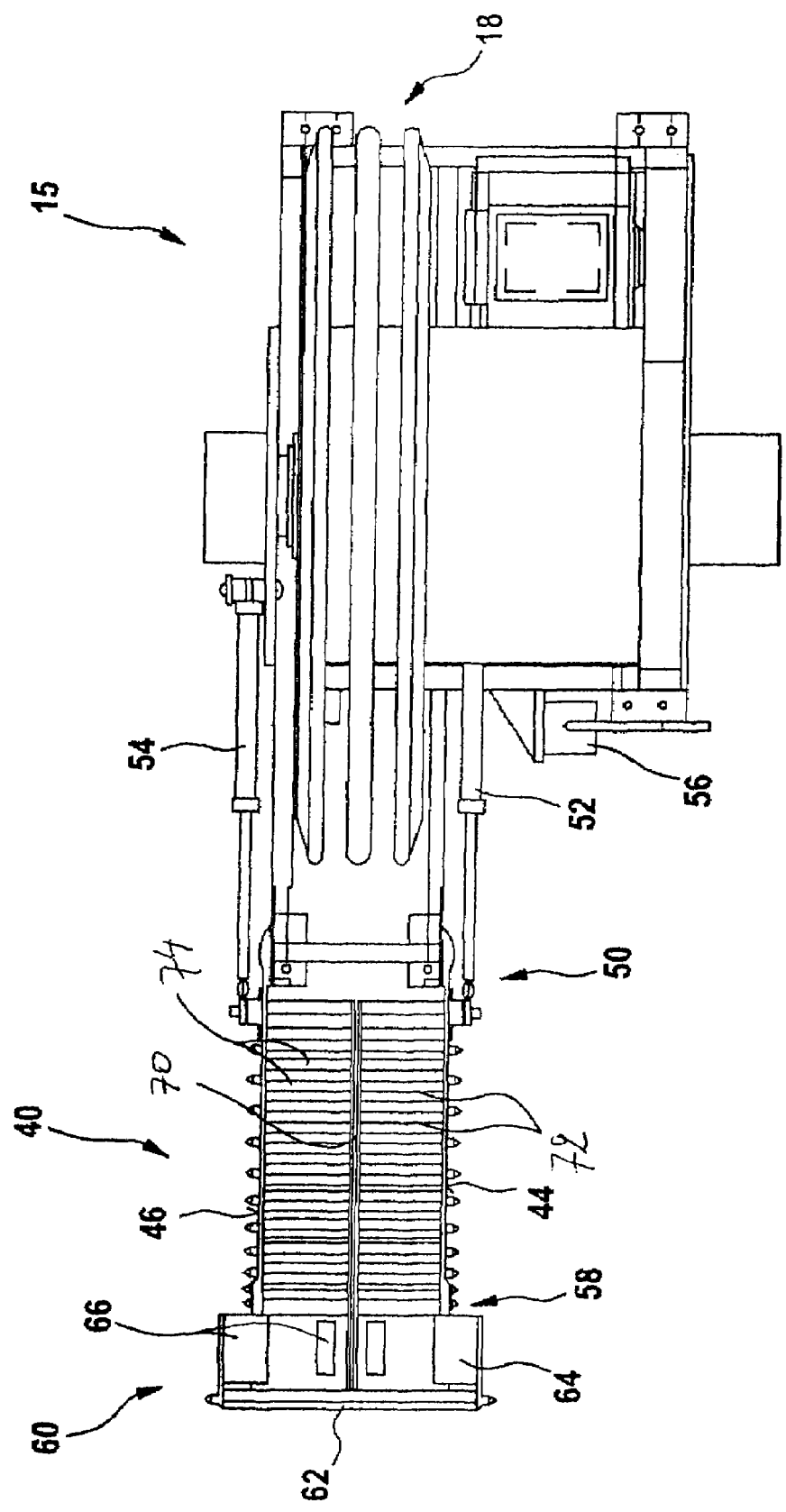
FIG. 3 shows an alternative embodiments.

If the rotational axis of the reel 18 is perpendicular to the dock-facing sidewall of the ship, the MPS system further comprises a support and guide system (not shown) for leading the power cable assembly 16 from the reel 18 to the cable guide 40 and for bringing the power cable assembly 16 in line with the cable guide 40. If the rotational axis of the reel 18 is parallel to the dock-facing sidewall, the cable guide 40 is preferably arranged directly in line with the power cable assembly 16, such that no support and guide system is necessary. In such a case, the cable management system 15 and the cable guide 40 preferably form a reel-guide assembly, wherein the cable management system 15 is mounted on a base 42 and the cable guide 40 is pivotably connected to the base 42. A cable management system 15 of this type is generally shown in FIGS. 1 and 2.

The cable guide 40 comprises first and second support elements 44, 46. These support elements 44, 46 are arranged parallel to each other and are made from strong material such as e.g. metal. Indeed, the cable guide 40 must be capable of carrying very heavy load and resist damage in very adverse weather conditions.

A plurality of rolls 48 are arranged between the first and second support elements 44, 46 for supporting and guiding the power cable assembly 16. These rolls 48 are preferably also made from strong material such as e.g. metal.

According to an embodiment, the cable guide 40 can comprise at least a third support element 70 between the first and second support elements 44, 46. A first set of rolls 72 is then arranged between the first and third support elements and a second set of rolls 74 is arranged between the third and second support elements 70, 46. By means of the third support element, the structure of the cable guide 40 is further strengthened and the cable guide 40 is divided into two zones, wherein two separate power cable assemblies can be guided over the edge of the ship independently from each other.

The cable guide 40 is pivotably connected with a first end 50 to the base 42 and at least two pistons 52, 54 are arranged between the cable guide 40 and the base 42 for pivoting the cable guide 40 between the active and rest positions. The pistons 52, 54 can be operated by a hydraulic hand pump 56. However, it is also possible to couple the cable guide 40 to a motor.

At a second end 58 of the cable guide 40, the latter comprises a guiding element 60 for guiding the power cable assembly 16 from the cable guide 40 down the side of the ship. Such a guiding element 60 preferably comprises the last one of the rolls 48 and an additional roll 62 at a distance therefrom so as to receive the power cable assembly 16 therebetween. The distance between the last one of the rolls 48 and an additional roll 62 is sufficient to also pass the connector 22 of the power cable assembly 16 therebetween. The guiding element 60 can further comprise two lateral rolls 64, 66. Such a guiding element 60 allows the power cable assembly 16 to be always guided from the dock onto the cable guide 40.

The invention claimed is:

1. A maritime power supply system comprising a cable guide assembly for guiding a power-cable assembly from and to a reel, said cable guide assembly comprising:
a base mounted to a floating support;
a reel mounted to the floating support via said base for storing a power cable assembly thereon; and
a cable guide mounted to said floating support via said base and having a first end and a second end;
said cable guide comprising first and second support elements arranged parallel to each other and a plurality of rolls arranged between said support elements for supporting and guiding said power cable assembly between said first and second ends,
wherein said cable guide is pivotably mounted with said first end on said base, and
wherein said cable guide is pivotable between an active position in which said second end extends beyond the edge of the floating support to guide said power cable assembly over said edge and prevent damage to the power cable assembly by contact with said edge during movement of said floating support, and a rest position in which said cable guide is retracted relative to said edge.

2. The system according to claim 1, further comprising at least one piston, said piston being connected between said cable guide and said base for pivoting said cable guide between said active and rest positions.

3. The system according to claim 2, further comprising at least one hydraulic pump for operating said at least one piston.

4. The system according to claim 1, further comprising:
a guiding element at said second end of said pivotable cable guide, said guiding element including two guiding rolls, said two guiding rolls being parallel to said plurality of rolls and being spaced apart so as to receive and guide said power cable assembly therebetween.

5. The system according to claim 4, said guiding element further including:
two lateral rolls, said two lateral rolls being perpendicular to said plurality of rolls and being spaced apart so as to receive and guide said power cable assembly therebetween.

6. A maritime power supply system comprising cable guide assembly for guiding a power-cable assembly from and to a reel, said cable guide assembly comprising:
a base mounted to a floating support;
a reel mounted to the floating support via said base for storing a power cable assembly thereon; and
a cable guide mounted to said floating support via said base and having a first end and a second end;

said cable guide comprising:
first, second and third support elements arranged parallel to each other;
a first plurality of rolls arranged between said first and third support elements for supporting and guiding said power cable assembly between said first and second ends; and
a second plurality of rolls arranged between said third and second support elements for supporting and guiding said power cable assembly between said first and second ends,
wherein said cable guide is pivotably mounted with said first end on said base, and
wherein said cable guide is pivotable between an active position, in which said cable guide is able to guide said power cable assembly over an edge and prevent damage to the power cable assembly by contact with said edge during movement of said floating support, and a rest position, in which said cable guide is retracted.

7. The system according to claim 6, further comprising at least one piston, said piston being connected between said cable guide and said base for pivoting said cable guide between said active and rest positions.

8. The system according to claim 7, further comprising at least one hydraulic pump for operating said at least one piston.

9. The system according to claim 6, further comprising:
a first guiding element at said second end of said pivotable cable guide, said first guiding element being associated with said first plurality of rolls; and
a second guiding element at said second end of said pivotable cable guide, said second guiding element being associated with said second plurality of rolls;
each of said first and second guiding elements including two guiding rolls, said two guiding rolls being parallel to said first and second plurality of rolls respectively and being spaced apart so as to receive and guide said power cable assembly therebetween.

10. The system according to claim 9, each of said first and second guiding elements further including:
two lateral rolls, said two lateral rolls being perpendicular to said first and second plurality of rolls respectively and being spaced apart so as to receive and guide said power cable assembly therebetween.

11. A maritime power supply system comprising a cable guide assembly of for guiding a power cable assembly from and to a reel, said cable guide assembly comprising:
a base mounted to a floating support;
a reel mounted to the floating support via said base for storing a power cable assembly thereon; and
a cable guide mounted to said floating support via said base and having a first end and a second end, said cable guide comprising first and second support elements arranged parallel to each other and a plurality of rolls arranged between said support elements for supporting and guiding said power cable assembly between said first and second ends;
a guiding element at said second end of said pivotable cable guide, said guiding element including two guiding rolls, said two guiding rolls being parallel to said plurality of rolls and being spaced apart so as to receive and guide said power cable assembly therebetween,
wherein said cable guide is pivotably mounted with said first end on said base, and
wherein said cable guide is pivotable between an active position, in which said cable guide is able to guide said power cable assembly over an edge and prevent damage to the power cable assembly by contact with said edge during movement of said floating support, and a rest position, in which said cable guide is retracted.

12. A maritime power supply system comprising cable guide assembly for guiding a power cable assembly from and to a reel, said cable guide assembly comprising:
a base mounted to a floating support;
a reel mounted to the floating support via said base for storing a power cable assembly thereon; and
a cable guide mounted to said floating support via said base and having a first end and a second end;
said cable guide comprising:
first, second and third support elements arranged parallel to each other;
a first plurality of rolls arranged between said first and third support elements for supporting and guiding said power cable assembly between said first and second ends; and
a second plurality of rolls arranged between said third and second support elements for supporting and guiding said power cable assembly between said first and second ends;
a first guiding element at said second end of said pivotable cable guide, said first guiding element being associated with said first plurality of rolls; and
a second guiding element at said second end of said pivotable cable guide, said second guiding element being associated with said second plurality of rolls;
wherein each of said first and second guiding elements including two guiding rolls, said two guiding rolls being parallel to said first and second plurality of rolls respectively and being spaced apart so as to receive and guide said power cable assembly therebetween,
wherein said cable guide is pivotably mounted with said first end on said base, and
wherein said cable guide is pivotable between an active position, in which said cable guide is able to guide said power cable assembly over an edge and prevent damage to the power cable assembly by contact with said edge during movement of said floating support, and a rest position, in which said cable guide is retracted.

* * * * *